United States Patent [19]
Swersey et al.

[11] 3,791,467
[45] Feb. 12, 1974

[54] SCALE HAVING A RESTRAINED MOVABLE BALANCING MEMBER

[76] Inventors: Burt L. Swersey, 313 W. Hartsdale Ave., Hartsdale, N.Y. 10530; Peter I. Fried, 61 Old Knollwood Rd., White Plains, N.Y. 10607

[22] Filed: Nov. 12, 1971

[21] Appl. No.: 198,133

Related U.S. Application Data

[63] Continuation-in-part of Ser. No. 89,233, Nov. 13, 1970, abandoned.

[52] U.S. Cl. .............. 177/157, 177/170, 177/210, 177/230, 177/254
[51] Int. Cl. ... G01g 23/02, G01g 23/14, G01g 3/14
[58] Field of Search ... 177/157, 170, 210, 229, 230, 177/246, 254

[56] References Cited
UNITED STATES PATENTS

| | | |
|---|---|---|
| 2,026,290 | 12/1935 | Taraoka ........................ 177/234 X |
| 2,668,702 | 2/1954 | Belknap ............................. 177/246 |
| 2,389,108 | 11/1945 | Thorsson ........................ 177/230 X |
| 2,993,370 | 7/1961 | Nye .................................. 177/210 X |
| 3,495,669 | 2/1970 | Yeager et al. ..................... 177/194 |

*Primary Examiner*—George H. Miller, Jr.
*Attorney, Agent, or Firm*—Kenyon & Kenyon Reilly Carr & Chapin

[57] ABSTRACT

The balance beam of the scale is provided with a flexure member such as a spring at one end which serves to react against the pivoting force exerted on the beam at the opposite end. A transformer is also mounted on the end of the beam to emit a signal proportional to the displacement of the beam from a zero-position. The flexure member is calibrated so that the signal of the transformer is proportioned to a measurement of weight of the mass being weighed on the scale.

32 Claims, 10 Drawing Figures

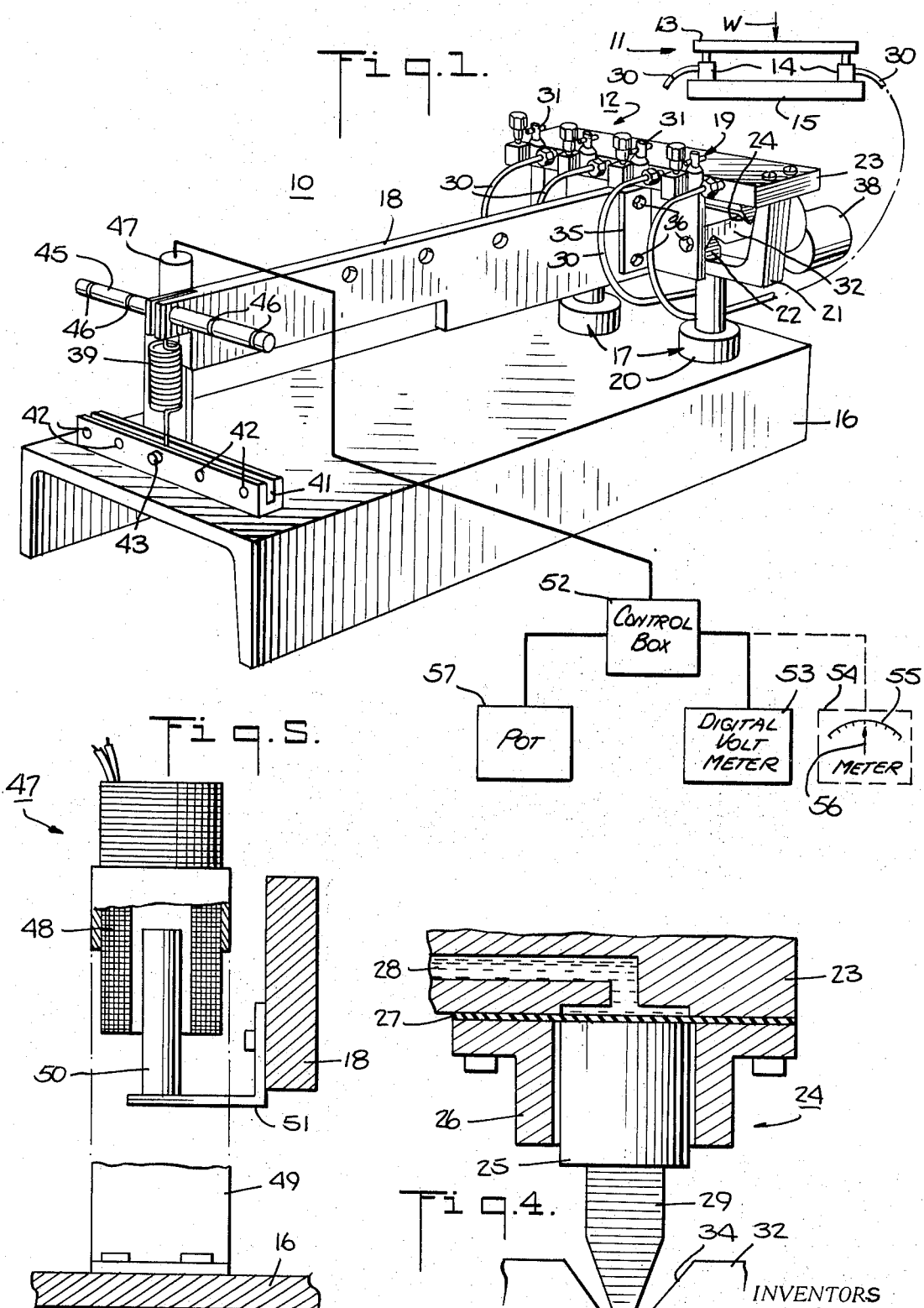

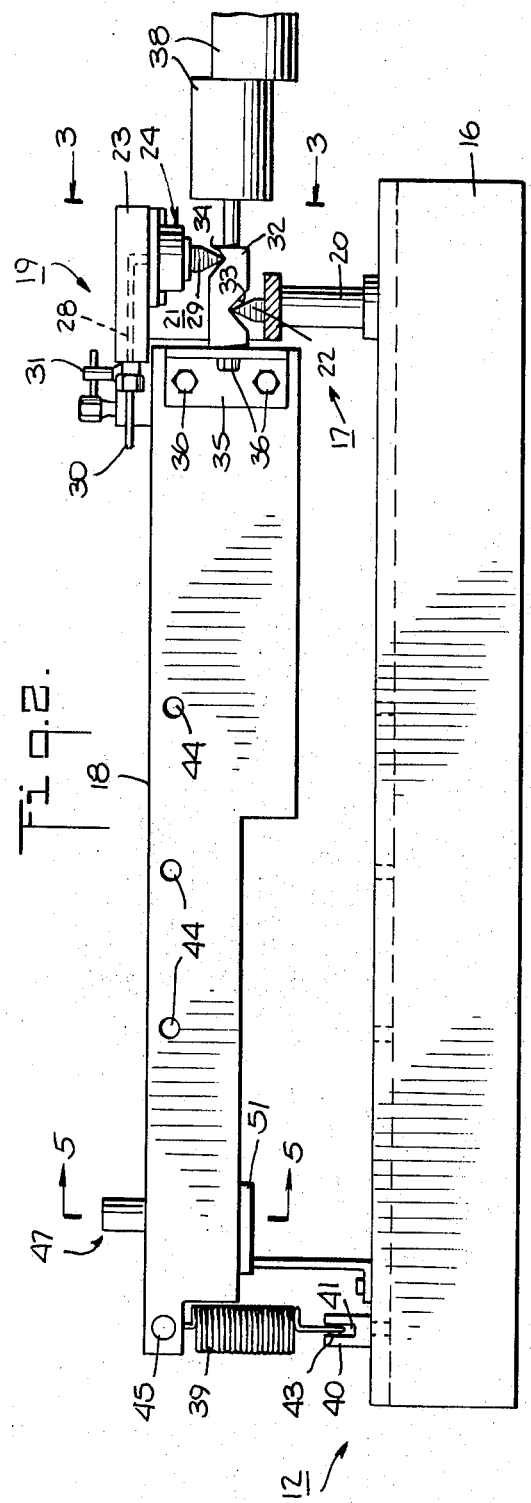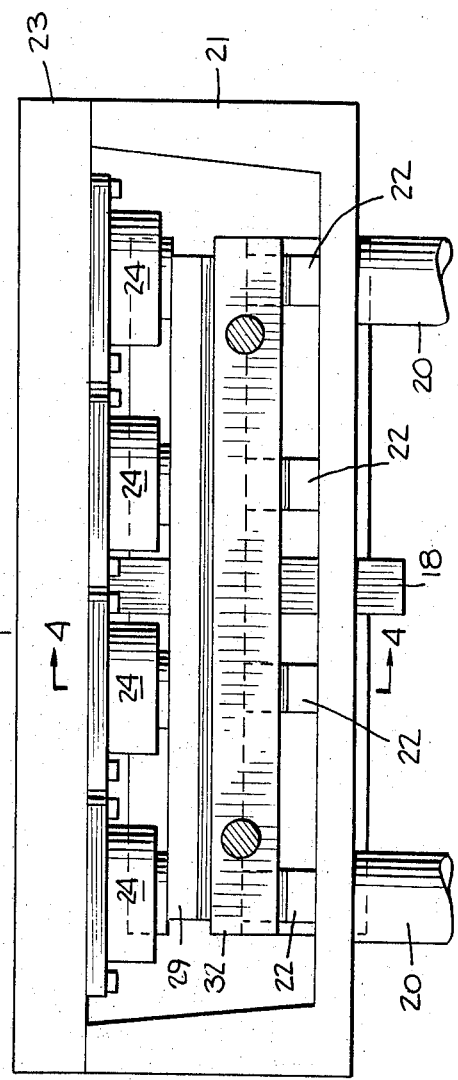

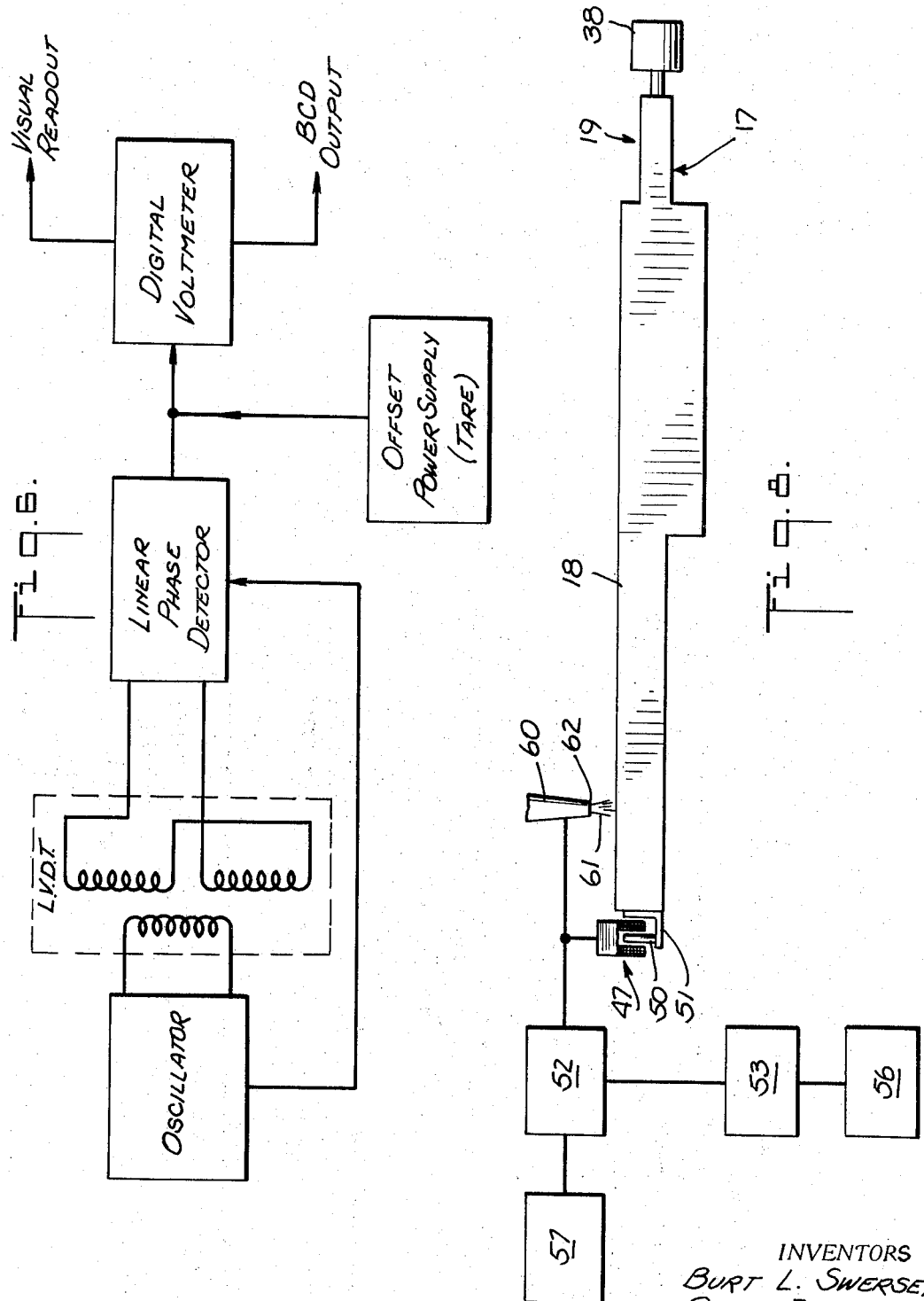

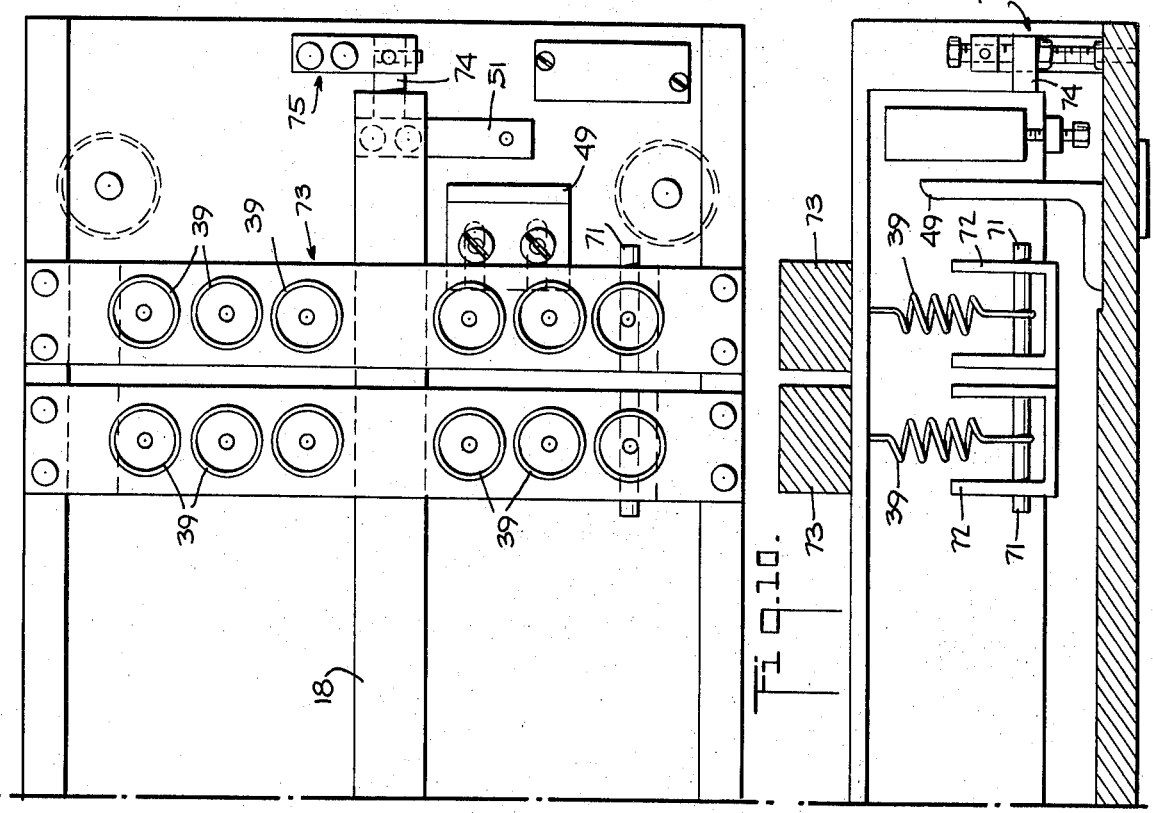
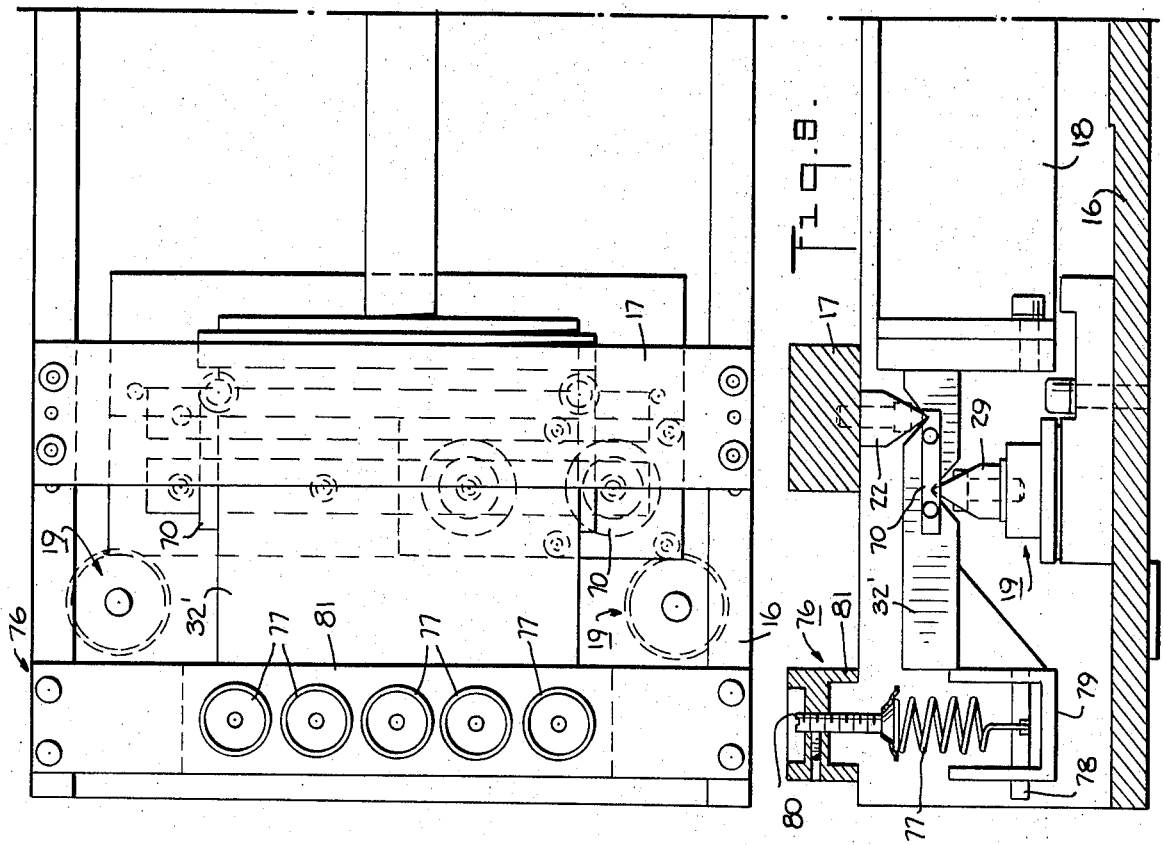

SCALE HAVING A RESTRAINED MOVABLE BALANCING MEMBER

This application is a continuation-in-part of co-pending application Ser. No. 89,233 filed Nov. 13, 1970, now abandoned.

The invention relates to a scale. More particularly, this invention relates to a scale having a balance beam which is restrained in a calibrated manner during movement in response to a weight.

Heretofore, various scales have been known for measuring the weight of a body. For example, it has been known to utilize a hydraulic scale having a load platform to receive a body and a hydraulic system which connects the load platform hydraulically to a balance beam so that the weight of the body can be transmitted as an unbalancing force onto the balance beam. Such a scale further utilizes a movable counterweight which is mounted on the balance beam to restore the balance beam to an original null condition. In these instances, the distance the counterweight moves from its original position to the final balance position is used as a measure of the weight of the body on the platform. These scales have generally been very accurate, for example, such scales have been known to provide accuracy of from 0.02 percent to 0.005 percent of the weighing range. However, in the case where the final position of the counterweight has been used as an indication of the weight of a body, it has generally been necessary to move the counterweight manually. As a result, in some applications of such scales, there has been an uneconomical use of time and labor. Further, in those cases where the amount of movement of the counterweight has been used as a measure of the weight, when the scales have been used to weigh over a relatively large range of loads, the time for the counterweight to travel from one end of the load range to the other has been relatively long. As a result, such scales can be inefficiently used in these circumstances.

Accordingly, it is an object of the invention to eliminate the need for a movable counterweight on a balance beam of a scale to balance out a load applied to the balance beam.

It is another object of the invention to provide a hydraulic scale which is sensitive to small increments of weight.

It is another object of the invention to provide a hydraulic scale which is capable of a full scale readout in a minimum of time.

It is another object of the invention to provide a hydraulic scale of component dimensions.

It is another object of the invention to reduce the response time of a scale readout to a minimum of time.

It is another object of the invention to accurately measure weights within a relatively small tolerance range.

It is another object of the invention to provide a hydraulic scale which is accurate to within 0.1 percent of a weighing range.

Briefly, the invention provides a scale which utilizes a restricted displacement of a member in response to an unbalancing force thereon caused by a weighted load as a means for obtaining the weight of the load. The degree of displacement of the member is used as a measure of the unbalancing force and is calibrated so as to permit a direct read-out of the weight of the load on a suitable read-out means.

The scale includes a load platform for receiving a body to be weighed thereon, a member which is hydraulically connected to the load platform for displacement from a predetermined balanced or zero position in response to the placement of a body on the load platform, a first means for proportionally restraining displacement of the member from the balanced position and a means for measuring a displacement of the member from the balanced position as a measure of the weight of the body on the load platform. This latter means includes one means for measuring the amount of displacement and a read-out means for indicating a weight proportional to the measured displacement so as to directly read-out the weight of the load.

In one embodiment, the displaceable member is in the form of a balance beam which is pivotally mounted on a fixed support while a hydraulic connection is formed between the load platform and balance beam so as to transmit a force on the balance beam proportional to the load on the platform. This force serves to unbalance the beam and pivot the same from the zero position. In addition, the means for restraining the displacement of the balance beam is in the form of a flexure member which is fixed at one end to the beam and at an opposite end to the fixed support. This flexure member, e.g., a coil spring, is calibrated so as to restrain the pivoting of the balance beam under the unbalancing force imposed through the hydraulic connection to the load platform. To this end, the flexure member is mounted so as to be stretched during pivoting of the beam. In this way, as the unbalancing force increases in magnitude, the degree of stretch of the flexure member increases proportionally thereto, in a linear relation.

The means for measuring the displacement of the movable member, i.e., the balance beam, from the balanced position is provided adjacent the end of the balance beam to determine the amount of deflection of the beam upon pivoting under the unbalancing force of a load. In addition, the measuring means and flexure member are calibrated with respect to each other so that the elongation of the flexure member under load is calibrated with respect to the measured amount of deflection for a given position of the flexure member relative to the fulcrum of the balance beam. The measuring means is further interconnected with a suitable readout device so that the amount of deflection can be transmitted to the readout means, e.g., in the form of an electrical output signal, and translated into a read-out indicative of the weight of the load on the scale.

The means for measuring the amount of deflection of the balance beam can be of any suitable nature. For example, a linear variable differential transformer coupled to a readout meter or other readout means by an electronic circuit can be used. Further, any other optical, magnetic, mechanical, pneumatic, hydraulic or other suitable device can be used to transmit a signal in correspondence to the amount of deflection of the balance beam to a readout means for indicating the weight of the load causing the deflection of the balance beam.

In the embodiment where a linear variable differential transformer is used, the transformer functions to emit a signal, e.g., an AC millivolt signal, in proportion to the amount of deflection of the balance beam to a digital volt meter as is known for purposes of a direct visual readout. Alternatively, the AC signal of the transformer can be converted to a DC signal, for example by demodulation, for transmission to the digital readout means. Still further, the signal can be delivered to a meter which includes a dial pointer which deflects from a zero point in correspondence to the strength of the signal supplied to the meter as well as a scale which indicates the magnitude of deflection. This scale can be scaled off directly in pounds or kilograms to indicate the weight of the load on the load platform of the scale. In this way, slight deflections can be accurately detected and the weight of the load causing such deflections can be accurately measured.

It is noted that any suitable restraining means can be used to restrain the pivoting motion of the balance beam. For example, it is possible to impose a flow of air against the balance beam through a shutter device. This shutter device would be actuated by the amount of deflection of the balance beam so as to increase the flow of air against the beam. In addition, depending upon the deflection of the beam, the means for measuring the deflection of the beam would emit a signal in dependence of the deflection so that the weight of the body can be accurately measured.

It is to be noted that it is not necessary to return the balance beam to the initial position in order to read out the weight of the load which displaces the beam. Instead, the amount of deflection of the beam is measured so as to obtain an accurate measurement of the weight.

In another embodiment, the scale which utilizes a pivotable beam for weighing purposes is provided with a tare means of a construction similar to the restraining means. For example, where the restraining means is in the form of one or more springs, the tare means is also in the form of a spring and is secured to the beam on an opposite side of a fixed knife edge assembly forming the fulcrum of the beam. The tare spring functions in an opposite manner to the restraining spring, i.e., when the restraining spring stretches, the tare spring compresses. The purpose of these tare springs is to provide for an initial preload on the beam where there is a light tare load. Should the tare load be a heavy load which provides a sufficient preload a less number of springs or no springs can be used. This also gives a greater sensitivity for the scale.

In the embodiment where a tare spring is used, the fixed knife edge assembly can be positioned to the topside of the beam along with the restraining spring and tare spring. The load is applied on the underside of the beam in this case. The advantage of this construction is that the dead weight of the beam itself is not applied to the totalizer knife edge. Thus, the beam does not have to be preloaded through the totalizer to balance the moment introduced by the weight of the beam about the fixed knife edge. Instead, as the springs maintain the beam in contact with the knife edge assembly through a minimal elongation of each, the hydraulic means for applying a load to the beam need only be in contiguous contact with the beam without applying any load thereon. Of course, a slight load may be applied to ensure contact. However, such would be insignificant relative to the gravity load of the load platform.

It is further noted that the scale can be used to automatically readout the weight of the load or to provide for a manual read out of the load. For example, in an automatic system, a signal from a transformer used in the deflection measuring means can be directed to a digital voltage meter which directly reads out the weight of the load. In the manual version, a null meter to null or compensate for the voltage is used instead of a digital volt meter along with two potentiometers, i.e., pots, with one of the pots connected to the meter so as to adjust the meter initially to zero. Thereafter, when a load is placed on the load platform of the scale, the pointer of the meter will deflect. The second pot, which can be a potentiometer provided with a rotatably digitally calibrated knob or which can be precision coupled to a mechanical counter, is used to tare out the meter so as to bring the pointer back to the zero point while at the same time indicating the weight on the digital knob of the pot or on the counter.

The scale of the invention can further be provided with a temperature compensator so that all temperature inaccuracies of the scale can be compensated. To this end, a thermistor and a summer can be used for calibration. In such a case, the thermistor changes in resistance in response to a change in temperature so that the signal from the differential transformer is compensated by the change in resistance so as to give a corrected signal for transmission to the digital volt meter of the readout means. Also, two temperature compensators can be provided; one for the hydraulic system so as to compensate for differences in temperature between the load platform load cells and the scale beam load cells and a second for the electronics of the system. In the event that a spring of predetermined spring constant is used to restrain the movement of the balance beam, such a spring is made of a temperature compensated material so that there is no zero creep due to temperature changes.

In addition, the scale can be provided with a digital printing voltmeter of known construction with a readout and a printer so that the weight of the body can be directly printed onto a log which can be applied, e.g., to a container in which a load of material is contained. The printer can also be added as a separate unit to the scale.

The scale may also have a read out means which includes a suitable means for receiving and directing the signal of the transformer to a printer or computer in the form of a binary coded decimal signal so that the weight of a load can be directly printed out or processed by the computer.

In addition, instead of using a single flexure member, any number of springs can be used to restrain the pivoting motion of the balance beam of the scale. Also, in the event that the beam is to have an increased or decreased working capacity, the position of the flexure member relative to the fulcrum of the balance beam can be changed along with a recalibration of the sensitivity control or span control of the digital volt meter.

These and other objects and advantages of the invention will become more apparent from the following detailed description and appended claims taken in conjunction with the accompanying drawings in which:

FIG. 1 illustrates a perspective view of a hydraulic scale constructed in accordance with the invention;

FIG. 3 illustrates a view taken on line 3—3 of FIG. 2;

FIG. 4 illustrates an enlarged view of a load cell for imposing a force on a common knife edge according to the invention;

FIG. 5 illustrates a fragmentary view of a linear variable differential transformer according to the invention;

FIG. 6 illustrates a block circuit diagram of the scale of FIG. 1;

FIG. 7 illustrates a schematic diagram of the scale of FIG. 1;

Figure 2:
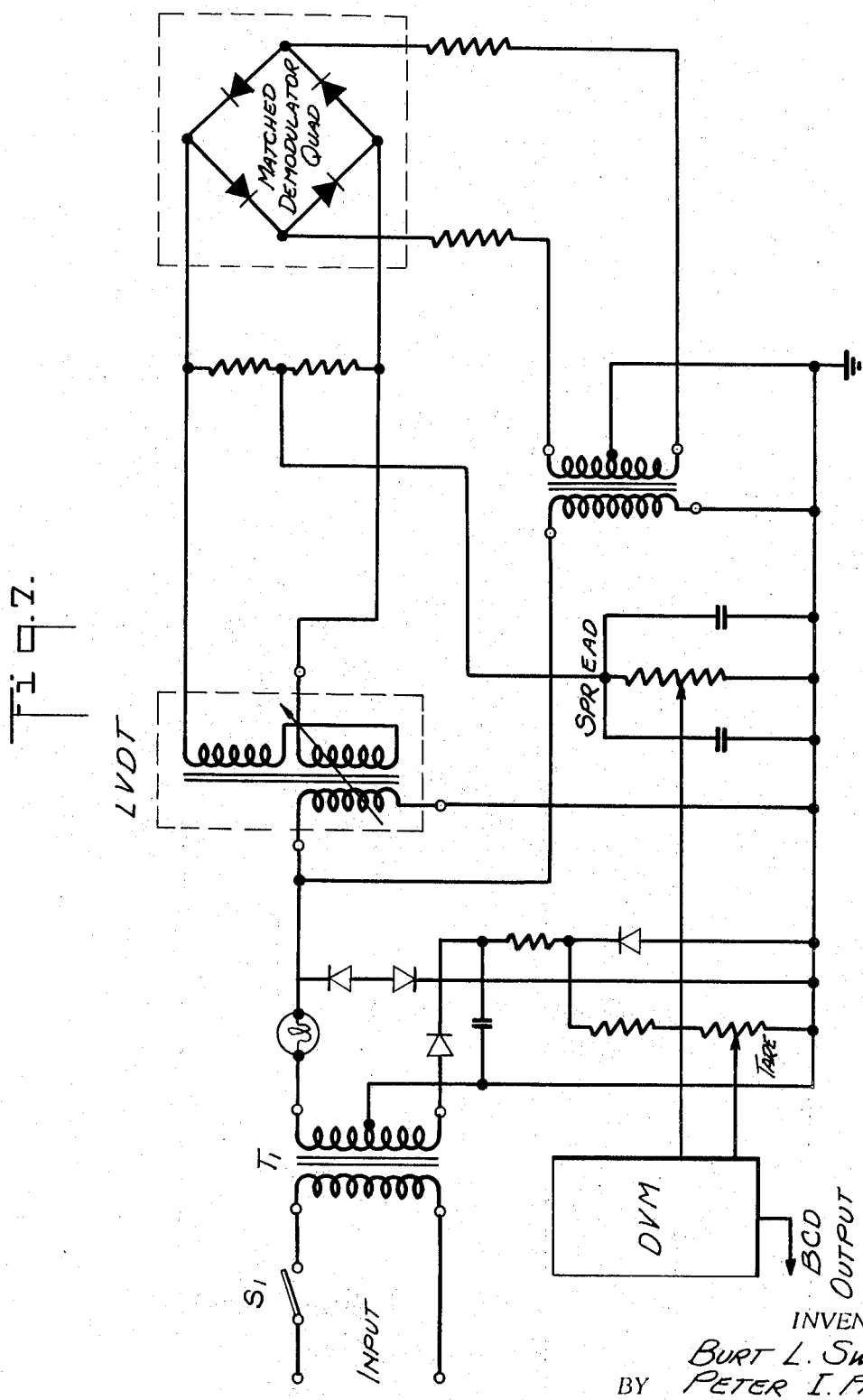
FIG. 2 illustrates a side view of the balance beam and support of FIG. 1.

FIG. 8 schematically illustrates a modified scale according to the invention utilizing a pneumatic restraining means;

FIG. 9 schematically illustrates a side view of a scale having a tare spring means according to the invention with a fixed knife edge assembly on the topside of a balance beam; and FIG. 10 schematically illustrates a plan view of the scale of FIG. 9.

Referring to FIG. 1, the scale 10 includes a load platform assembly 11 for receiving a load thereon and a balance beam assembly 12 for indicating the weight of the load placed on the load platform assembly 11.

The load platform assembly 11 is of any suitable construction and consists, for example, of a loading or load platform 13 e.g., of rectangular shape mounted on a plurality of hydraulic load cells 14, each of which is placed at the corners of the plate form 13 and a bed 15 which mounts the load cells 14 thereon. These respective load cells 14 can be constructed in any suitable manner such as shown in U.S. Pat. No. 3,338,323 or 3,530,949. The load platform assembly 11 is of relatively small height, e.g., 3 inches. In this way, the assembly 11 can be mounted directly on a floor so that heavy loads can be transported onto the platform 13, for example, by a hand truck rolling up a ramp adjacent to the platform 13. Alternatively, the load platform assembly 11 can be recessed within a pit within a floor so that a load can be transported directly onto the platform 13 without the need for a ramp.

Referring to FIGS. 1 and 2, the balance beam assembly 12 includes a support bed 16 of channel shaped construction or any other suitable shape, a knife edge assembly 17 which is fixedly mounted to the support bed, a balance beam 18 which is pivotally mounted on the knife edge assembly 17 and a means 19 for imposing an unbalancing force on the beam balance 18. The knife edge assembly 17 (FIG. 3) includes a pair of column supports 20 which are vertically disposed and fixedly secured to the support bed 16, and a U-shaped saddle 21 which is secured to the supports 20. The saddle 21 is disposed transversely of the balance beam 18 and carries a plurality of aligned knife edges 22 thereon while supporting a support plate 23 over the knife edges 22. The support plate 23 is fixed, as by bolts 24, to the saddle 21 and supports a plurality of hydraulic load cells 24 in depending manner therefrom.

Referring to FIG. 4, each load cell 24 includes a piston 25 which is mounted in an unguided manner within a housing 26 secured to the support plate 23 and a flexible diaphragm 27 which is secured between the housing 26 and the support plate 23 to lie in a normally flat condition over a recess in the plate 23 in the projected plane of the piston 25. Alternatively, the load cells 25 can be constructed as in the above mentioned patents. The support plate 23 includes a suitable duct 28 therein which communicates the surface of the plate 23 adjacent the diaphragm 23 with another surface so as to transmit a flow of hydraulic fluid thereto. In addition, the load cell 24 connects to a common knife edge 29.

Referring to FIG. 1, the load platform assembly 11 is hydraulically connected to the beam balance assembly 13 by way of suitable hydraulic lines 30 such that each line 30 connects a load cell 14 of the load platform ssembly 11 with a respective load cell 24 in the balance beam assembly 12. In this way, the hydraulic fluid within the lines 30 communicates directly with the respective diaphragms 27 of the load cells 24 on the opposite side of the piston. As a result, should a load be placed on the load platform 13, as the pressure in the hydraulic lines 30 increases, the respective diaphragms 27 lift from the support plate 23 in the region of the ducts 28 so as to force the respective pistons 25 outwardly from the housings 26. It is to be noted that each piston 25 is mounted within a housing 26 with a clearance so as to avoid frictional drag thereon.

Each hydraulic line 30 which communicates with a corresponding duct 28 within the support plate 23 is provided with a suitable valve assembly 31 to permit adjustments in the volume of hydraulic fluid in the duct 28 prior to use of the scale so as to set the pistons of the load cells 14 at the proper height at the load platform 13.

Referring to FIG. 2, the balance beam 18 which is of an elongated length and narrow thickness carries an extension 32 at one end. This extension 32 is in the form of a bar which extends parallel to the saddle 21 and includes a pair of V-shaped notches 33, 34 therein. One notch 33 is formed in a lower surface of the extension 32 and is disposed over the knife edges 22 carried by the saddle 21 so as to establish a fulcrum for the beam 18. The second notch 34 is formed in the upper surface of the extension 32 and receives the common knife edge 29 so that an unbalancing force due to a load W on the platform assembly 11 can be imposed on the balance beam 18. The extension 32 is secured to the remainder of the beam 18 by means of a pair of brackets 35 and suitable bolts 36. In addition, the extension 32 carries a plurality of shafts 37 which extend away from the remainder of the balance beam 18 for mounting of counterweights 38 thereon.

Referring to FIGS. 1 and 2, the balance beam assembly 12 further includes a flexure member 39 in the form of a single coil spring which is fixedly secured at one end to the support bed 16 and at the opposite end to the beam 18. To this end, the support bed 16 is provided with an elongated channel shaped member 40 which defines an elongated recess 41 and a plurality of apertures 42 which communicate across the recess 41 for selectively receiving a pin 43. The pin 43 serves to anchor a hooked end (not shown) of the spring 39 with the recess 41 of the channel shaped member. In similar fashion, the balance beam 18 is provided with a bifurcated end having apertures 44 therein for receiving an elongated rod 45 which extends transversely of the balance beam 18. This rod 45 has a plurality of annular grooves 46 therein for receiving a hooked end (not shown) of the spring 39 therein with the bifurcation. This flexure member 39 has a spring constant of predetermined value such that the upward pivoting of the balance beam 18 from a balanced position causes a calibrated elongation of the spring 39 and a corresponding calibrated restraint of the beam 18.

It is to be noted that any suitable number of flexure members 39 can be secured between the support bed 16 and the balance beam 18 in order to restrain the motion of the balance beam 18. Further, the balance beam 18 is provided with a plurality of apertures 44 so as to permit the rod 45 for anchoring the spring 30 to be mounted in any one of a number of predetermined positions. In a similar manner, the support bed 16 is provided with suitable threaded openings so as to permit the elongated channel shaped member 40 to be secured in different positions along the support bed 16 relative to the openings in the balance beam 18. In this way, depending upon the forces which are to be weighed on the load platform, the position of the flexure member can be changed to accommodate such load ranges.

Referring to FIGS. 1 and 5, the balance beam assembly 12 also includes a linear variable differential transformer 47 which is mounted near one end of the balance beam 18. This transformer 47 includes a coil 48 which is fixedly mounted on a suitable bracket 49 fixed to the support bed 16 and a core 50 which is fixedly mounted on a bracket 51 fixed to the balance beam 18. The core 50 is disposed in a vertical plane and co-operates with the coil 48 so as to produce an electrical AC output signal when the core 50 is moved within the coil 48 during displacement of the beam 18. As shown in FIG. 1, the coil 48 of the transformer 47 is electrically connected to a suitable control box 52 including a demodulator so that the output signal can be converted into a DC signal or a linear phase detector so that the phase of the AC signal can be detected. The control box 52, in turn, is electrically connected to a digital readout means 53 so that the weight of the load can be read out directly in relation to the signal received in the read out means.

Alternatively, the read out means can include a meter 54 having a scale 55 and a movable pointer 56 thereon which indicates the strength and direction of the output signal. This meter 54 can be calibrated to read out directly in pounds or kilograms for small deviations. Also, the meter 54 can be connected electrically to a digital readout (not shown), such as a printer, which receives a signal from the meter 54 so as to digitally indicate the value corresponding to the strength of the signal received in the meter 54.

In addition, a digital precision potentiometer 57 is connected to the control box 52 so as to permit the voltage signal received therein to be tared out so that the reading on the readout means 53, 54 can be returned to a zero position should a preload on the spring 37 cause the transformer 47 to emit an output signal. Also, the zero position can be obtained electronically by incorporation of suitable circuitry which is operated by a push button.

In operation, the hydraulic scale 10 is first balanced so that the pistons of the load cells 14 are in a first position. At this time, the balance beam 18 is positioned in a generally hroizontal plane while the coil spring 39 is in a slightly stretched condition so as to provide a very slight preload on the balance beam 18. At the same time, the digital read out 53 registers zero. In the event that the digital readout 53 does not indicate a zero digit, the potentiometer 57 can be manually adjusted so as to bring the readout 53 to the zero position. A load W is then placed on the load platform 13. As a result, the hydraulic pressure within the load cells 14 under load platform 13 transmit a pressure through the hydraulic lines 30 into the load cells 24 of the balance beam assembly 12. In order to reduce the load applied to the pistons 25 the respective sets of load cells 14, 24 are dimensioned, for example, on a four to one basis so that the load transmitted to the balance beam assembly 12 is proportional to the load W on the platform 13. As the pressure in the load cell 24 in the balance beam assembly 12 increases, the knife edge 29 is moved in a downward direction causing the balance beam 18 to pivot about the fulcrum. At the same time, the flexure member 30 restrains the pivoting movement of the balance beam 18 in a calibrated manner. However, the balance beam 18 will deflect upwardly from the balanced position causing the core 50 of the transformer 47 to move relative to the coil 48 and causing an electrical signal in millivolts to be transmitted to the control box 52. The signal is then transmitted to the digital readout 52 so that a value proportional to the electrical signal and equal to the actual weight of a load W on a load platform 13 is readout.

The centerline of action of the flexure member 39 is precisely located with respect to the fulcrum of the balance beam 18. In this way, a precise proportional restraining force can be imposed on the balance beam 18 during a weighing operation in opposition to the unbalancing force imposed on the balance beam 18 by the hydraulic fluid of the hydraulic system. Consequently, the amount of deflection of the balance beam 18 gives a proportional indication of the true weight of the load W on the load platform 13. This deflection (which can amount to 0.040 inches maximum), is accurately detected by the transformer 47 and a signal proportional to the deflection is emitted to the control box 52 which translates the signal to an accurate digital readout in the read out means 53. As a result, the readout accurately indicates the actual weight of the load W on the load platform 13 during a weighing operation.

It is further noted that a scale constructed in accordance with this invention provides an accurate readout out of 0.1 percent or better of the weighing range of the scale, i.e., one part in one thousand. In addition, the response time of the scale can be varied within any suitable range, such as from 0.2 seconds to 3 seconds.

It is further noted that the core 50 of the transformer 47 is located in a vertical plane. However, the deflection of the balance beam 18 from the balanced position either upwardly or downwardly is generally of limited amount such that the core 50 does not deflect from a vertical position to any significant degree. This core 50 can also be mounted in a manner so as to compensate for variations in beam movement due to temperature. For example, the core 50 can be mounted on a bimetallic bracket 51 which causes the core 50 to move in a direction to compensate for temperature induced movements in the remainder of the scale.

It is further noted that the scale can be initially tared out so as to compensate for an initial preload on a load platform 13. For example, should any empty container be placed on the load platform 13, an electrical signal will be emitted by the transformer 47 and the digital readout 53 will indicate the weight of the container. Thereafter, the pot 57 is adjusted, e.g., manually, to balance out the electrical signal from the transformer 47 such that the signal readout 53 will have a zero scale reading. Thereafter, the material to be weighed can be deposited into the container on the load platform. The balance beam 18 will then deflect to a greater amount so that the signal from the transformer 47 will increase in intensity and produce a reading on the readout 53. The reading of the digital readout 53 will then be an accurate reading of the weight of the contents of the container.

It is also noted that the digital readout can be in the form of a digital volt meter which gives negative and positive values. Such a readout can be used to determine deviations in weight from a standard weight of prefilled containers. In such a case, the zero point of the readout would indicate the standard full load. The readout could also use the zero point to indicate a no load position.

It is further noted that if a variable load is to be placed on the load platform 13 that the scale 10 which uses the volt meter 54 in the readout means not only will indicate the actual weights of the varying load but also the meter 54 will indicate whether the weight is decreasing or increasing since the pointer 56 of the meter 54 will deflect about the zero point of the scale 55 thereon in accordance with the directional output signal received from the transformer 47. In this way, the scale can be used in various types of batching operations wherein a load of material is poured into a container which has been previously mounted on the load platform.

Depending upon the load to be placed on the load platform 13, the position of the flexure member 39 can be adjusted longitudinally of the balance beam 18. That is, where the range of loadings are to be of relatively small weights, the flexure member 39 can be positioned closer to the fulcrum. On the other hand, where the range is for relatively large weights, then the flexure member 39 is positioned at the farthest position from the fulcrum. In addition, more than one flexure member can be used on the scale 10 such that the capacity of the scale can be further increased. In any of these cases, the proportional constants, such as, the spring constants of the flexure members, are calibrated with respect to the signals which are emitted by the transformer 47 by a suitable control within the digital readout so that accurate readings can be given for different positions of the flexure member with respect to the fulcrum of the balance beam 18. In this respect, for a given constant weight, the closer the flexure member 39 is brought to the fulcrum of the balance beam 18, the greater will the deflection of the balance beam be from the balanced position. As a result, the strength of the signal from the transformer 47 will increase. In order to compensate for this increase signal, the digital readout 53 is proportionally adjusted to indicate the correct weight of the load on the load platform.

It is further noted that the balance beam assembly 12 of the scale 10 can be located a substantial distance from the load platform assembly 11. In this way, the balance beam assembly 12 can be isolated from surrounding environmental conditions so as to be uneffected thereby. For example, the balance beam assembly 12 can be enclosed within a housing (not shown) which is maintained at a constant temperature and humidity such that fluctuations due to these parameters will not be introduced into the operation of the scale 10. Alternatively, the balance beam assembly 12 can also be provided with a suitable temperature compensator in order to compensate for variations in temperature. To this end, a thermistor can be utilized for calibration. In such a case, all temperature inaccuracies can be summed together in the thermistor so that the absolute value of the temperature variation can be obtained for correcting the signal from the transformer 47.

The scale can also be modified to utilize two digital volt meters. In this instance, one digital volt meter can be used to measure the gross and net weight of the load on a load platform while the second meter is used to measure only the net weight of the contents of the container or fluctuations in weight of a variable load on the load platform.

The scale of the invention can also be constructed so as to utilize a manual control. In this case, the scale would use a DC amp meter instead of a digital volt meter as above and two pots. One pot would be utilized to bring the amp meter to a zero reading before a load is supplied to the load platform in order to balance out any signal emitted by the transformer due to the deflection of the beam from the balanced position thereof. Thereafter, a load would be mounted on the load platform and the amp meter would read out a signal in proportional correspondence therewith. The second digital pot would then be coupled with the amp meter and would be manually adjusted as by a calibrated knob or a knob connected to a counter so as to compensate the reading on the meter. That is, the second pot would bring the pointer of the amp meter back to a zero reading while at the same time the calibrated knob or counter is caused to indicate the weight of the load on the load platform as the meter reading is decreased. Alternatively, the amp meter can be calibrated for a direct readout of small deviations of the balance beam.

Referring to FIG. 6, a block diagram of the electrical circuitry between the transformer, digital volt meter and potential are shown. It is not believed that any further description of the block diagram is required.

Referring to FIG. 7, a schematic diagram of the electrical circuit of the scale is shown and no further description is believed to be necessary.

Referring to FIG. 8, wherein like reference characters indicate like parts as above, the scale can alternatively be constructed such that the restrain on the beam 18 is imposed by a jet of air. In such a case, instead of using a flexure member as above, a suitable pneumatic assembly 60 is positioned adjacent to the balance beam 18 so as to cause a jet of air 61 to impinge upon the balance beam 18 in counterbalance to the application of the load from the hydraulic system. In addition, the force of the jet of air 61 on the balance beam 18 is varied proportionally in the manner of a linear spring to the amount of deflection of the beam 18. That is, as the beam 18 increases in an upward deflection as viewed towards the source of the air jet, the force of the air jet is increased. For example, the velocity head of the air jet is increased by narrowing the jet of air by means of a shutter (not shown) at the orifice 62 of the pneumatic system 60 through which the air jet is expelled. This shutter is controlled in relation to the amount of deflection of the beam 18 as sensed by a transformer 47 as above, positioned adjacent to the balance beam 18. The signal which is emitted by the transformer 47 is transmitted, as above, through a control box 52 and readout 53 as well as directly to the shutter such that as the amount of deflection increases, the signal increases and causes the shutter to close. The calibration of the shutter is such as to proportionally change the force of the air jet on the balance beam 18 in a manner similar to the member described above.

The pneumatic system 60, as above, can be movably mounted in any one of a number of predetermined positions along the balance beam 18 in any suitable manner.

It is noted that the balance beam assembly can be oriented in the position as shown or in a position turned 180° over on itself.

Referring to FIGS. 9 and 10, wherein like reference characters indicate like parts as above, the fixed knife edge assembly 17 is mounted to have the knife edge or edges 22 abut the extension 32' of the balance beam 18 on the topside. Also, the means 19 for imposing a load is mounted on the underside of the beam 18 to have the knife edge 29 abut the extension 32'. In addition, an end restraint 70 is secured on each side surface of the estension 32' to prevent lateral slippage of the respective knife edges 22, 29.

The restraining means includes a plurality of coil springs 39 or the like arranged in two rows of six springs. Each spring 39 is secured at one end to a pin 71 which, in turn, is mounted in a channel shaped holder 72 secured to a side wall of the beam 18. The opposite end of each spring 39 is secured in a housing 73 mounted on and extending across the support bed 16.

As above, a linear variable differential transformer (not shown) is mounted at the end of the beam 18 on a bracket 49. Also, a restraint block 74 is secured to the end of the beam 18 to project into a restraint assembly 75 so that a limit control is imposed on the amount of movement of the beam 18. The restraint assembly 75 is adjustable as shown.

Additionally, a tare means 76 is mounted to an opposite side of the knife edge assembly 17 from the coil springs 39. This tare means 76 includes a single row of six coil springs 77 each of which is fixed to a pin 78 mounted in a channel shaped holder 79 which is, in turn, secured to the beam 18. The upper end of each spring 77 is secured over an adjusting screw 80 so as to be elongated under tension upon turning of the screw 80. To this end, each screw 80 is threaded into a fixed housing 81 extending above and across the bed 16.

The knife edges 29 of the totalising means 19 are positioned to abut the extension 32' and impose a slight, if any, force thereon when the beam 17 is in a level zero or null position. To this end, the height of the knife edges 29 can be made adjustable in any suitable manner. Thus, the springs 39, 77 serve to support the dead weight of the beam 17 and connected components while elongating slightly. This elongation can be calibrated into the scale during manufacture or when in use. Further, adjustment of the beam 17 can be easily carried out via the adjusting screws 80.

As the beam is free of gravity imposed loads, the beam can be oriented in any suitable position including a vertical position. The scale otherwise operates as described above.

In order to operate the system while incurring vibration or while withstanding shock loadings, suitable valves are provided in the hydraulic lines to the totalizer which provide a variable orifice. By varying the valve openings, any wave action in the hydraulic fluid caused by a vibration imposed on the weighing system can be damped. Also, any overload caused by a shock loading can be damped.

The scale, as described above, is further capable of resisting side loads which may be imposed on a load platform or the load cells in view of the vibration damping characteristics thereof.

It is further noted that the scale of the invention can be used with a printing system in which the signals emitted by the digital readout can be used for printing of corresponding values on a log sheet. In such a case, a printing digital volt meter as is known can be used for the readout and printing. Alternatively, the printer can be a separate unit from the readout.

Further, the readout device can also be constructed as a potentiometer to receive a voltage signal from the control box via a voltmeter, as described above. In this case, the potentiometer is constructed so as to balance out the received voltage by applying a reverse or negative voltage thereto. By thus functioning as a null meter, the amount of negative voltage applied is used to digitally indicate the weight of a load being weighed.

It is noted that instead of using a load platform per se to receive a load to be weighed, a single load cell can be used to receive the load. Also, one or more load cells can be connected, e.g., to the base of a tank which is to receive a charge of material to be weighed.

The invention thus provides a scale which is accurate to a significant degree and which can be used for various industrial purposes. In addition, the scale is of compact construction such that the balance beam assembly can be isolated from the loading platform and the environment surrounding the loading platform.

The invention further provides a scale which is precise and which can be constructed in an economic manner. In this respect, it is noted that the hydraulic system of the scale prevents the occurrence of any vibrational problems which would otherwise effect the precision of the scale.

The invention further provides a scale which can operate in spite of vibrations, shock loadings or side load variations with extreme accuracy.

What is claimed is:

1. A scale comprising
    a balance beam;
    a support pivotally mounting said balance beam thereon in a first position;
    means for imposing an unbalancing force on said balance beam proportional to a load to be weighed for pivoting said balance beam on said support from said first position, said means including a load platform for receiving a body to be weighed and a hydraulic means for transmitting a force proportional to the weight of a body on said load platform to said balance beam;
    first means fixedly secured to said beam and to said support for proportionally restraining the pivoting of said balance beam under an imposed unbalancing force; and
    means spaced from and calibrated to said first means for measuring a displacement of said balance beam from said first position as a calibrated measure of the unbalancing force on said balance beam.

2. A scale as set forth in claim 1 wherein said hydraulic means includes a first plurality of hydraulic load cells supporting said load platform, a second plurality of hydraulic load cells hydraulically connected to said first plurality of load cells in spaced relation, and a knife edge connected in common to said second plurality of load cells for imposing the unbalancing force onto said balance beam.

3. A scale as set forth in claim 1 further comprising tare spring means secured to said beam for restraining the pivoting of said beam, and wherein said support abuts the topside of said balance beam.

4. A scale as set forth in claim 1 wherein said means for proportionally restraining the pivoting of said balance beam is adjustably mounted at predetermined positions longitudinally of said support and said balance beam.

5. A scale as set forth in claim 1 wherein said means for proportionally restraining the pivoting of said balance beam is a flexure member fixed at one end to said support and at an opposite end to said balance beam.

6. A scale as set forth in claim 5 wherein said flexure member is mounted on one side of said support and said means for imposing an unbalancing force is mounted on an opposite side of said support.

7. A scale as set forth in claim 1 wherein said means for proportionally restraining the pivoting of said balance beam includes at least one row of coil springs.

8. A scale as set forth in claim 7 further including at least one tare spring on an opposite side of said support for restraining pivoting of said beam, said tare spring functioning in an opposite sense to said coil springs.

9. A scale as set forth in claim 1 wherein said means for measuring a displacement of said balance beam includes a linear variable differential transformer for sensing the displacement of said balance beam and emitting an electrical output signal directly proportional to the displacement and a read-out means connected to said transformer to receive said output signal and to digitally indicate the weight of the load causing said unbalancing force on said balance beam in proportional response to said output signal.

10. A scale as set forth in claim 9 wherein said read-out means is a digital read out.

11. A scale as set forth in claim 9 wherein said read-out means is a DC amp meter calibrated to directly read-out the weight of the load.

12. A scale as set forth in claim 9 wherein said read-out means includes a volt meter connected to said transformer to receive said output signal and to indicate the voltage strength and direction of said output signal.

13. A scale as set forth in claim 12 wherein said read-out means further includes a first precision digital potentiometer connected to said transformer for adjusting said meter to a zero equilibrium position corresponding to the balanced position of said balance beam whereby said meter can be tared out before an unbalancing force is applied to said balance beam.

14. A scale as set forth in claim 13 which further includes a second digital volt meter connected to said transformer to receive said output signal and a second read-out means connected to said second digital volt meter to receive a signal therefrom; said second volt meter being adjustable to tare out a first output signal whereby subsequent output signals from said transformer are transmitted to said second read-out means to provide measured values of net weight of a variable unbalancing force.

15. A hydraulic scale as set forth in claim 13 wherein said read-out means further includes a second precision digital pot connected to said transformer and said meter for adjusting said meter to said zero equilibrium position with said balance beam displaced from said balance position whereby said meter can be tared out with said second pot indicating the weight of the load.

16. A hydraulic scale comprising
a load platform for receiving a body to be weighed thereon;
a balance beam;
a support pivotally mounting said balance beam thereon in a balanced position;
hydraulic means for transmitting a force proportional to the weight of a body on said load platform to said balance beam to pivotally displace said balance beam from said balanced position;
first means for proportionally restraining the displacement of said balance beam from said position;
second means for measuring a displacement of said balance beam from said position; and
read-out means connected to said second means for indicating a weight proportional to a measured displacement of said balance beam whereby the weight of the body on said load platform is indicated.

17. A hydraulic scale as set forth in claim 16 wherein said load platform is spaced from said balance beam and said support.

18. A hydraulic scale as set forth in claim 16 wherein said first means is a flexure member.

19. A hydraulic scale as set forth in claim 16 further comprising a tare spring means connected between said support and said beam to restrain pivoting thereof.

20. A hydraulic scale as set forth in claim 19 wherein said support abuts said beam on the topside between said tare spring means and said first means.

21. A hydraulic scale comprising
a load platform for receiving a body to be weighed thereon;
a member hydraulically connected to said load platform for displacement from a predetermined position in response to the placement of a body on said load platform and movement of said load platform;
first means for proportionally restraining displacement of said member from said first position;
second means for measuring a displacement of said member from said first position; and
read-out means connected to said second means for indicating a weight proportional to a measured displacement of said member whereby the weight of the body on said load platform is indicated.

22. A hydraulic scale as set forth in claim 21 wherein said member is a pivotally mounted balance beam.

23. A hydraulic scale as set forth in claim 21 further comprising a tare spring means connected between said load platform and said member for restraining movement of said member.

24. A hydraulic scale as set forth in claim 21 wherein said first means includes a flexure member secured at one end to said balance beam and at an opposite end to a fixedly mounted support.

25. A hydraulic scale as set forth in claim 24 wherein said flexure member is adjustably mounted longitudinally of said balance beam.

26. A hydraulic scale comprising
a load platform for rceiving a body to be weighed thereon;
a balance beam;
a support pivotally mounting said balance beam thereon in a balanced position;

hydraulic means for transmitting a force proportional to the weight of a body on said load platform to said balance beam to pivotally displace said balance beam from said balanced position;

first means for proportionally restraining the displacement of said balance beam from said position;

an electrical means spaced from said first means for measuring a displacement of said balance beam from said position; and read-out means connected to said electrical means for indicating a weight proportional to a measured displacement of said balance beam whereby the weight of the body on said load platform is indicated.

27. A hydraulic scale as set forth in claim 26 wherein said electrical means is calibrated with respect to said first means.

28. A hydraulic scale as set forth in claim 26 wherein said first means is a flexure member and wherein said flexure member and said electrical means are calibrated with respect to each other whereby the elongation of said flexure member under load is calibrated with respect to the measured amount of deflection for a given position of said flexure member relative to a fulcrum of said balance beam.

29. A scale comprising a balance beam;

a support pivotally mounting said balance beam thereon in a first position;

means for imposing an unbalancing force on said balance beam proportional to a load to be weighed for pivoting said balance beam on said support from said first position;

first means for proportionally restraining the pivoting of said balance beam under an imposed unbalancing force;

means spaced from said first means for measuring a displacement of said balance beam from said first position as a measure of the unbalancing force on said balance beam; and tare spring means secured to said beam for restraining the pivoting of said beam, and wherein said support abuts the topside of said balance beam.

30. A scale comprising a balance beam;

a support pivotally mounting said balance beam thereon in a first position;

means for imposing an unbalancing force on said balance beam proportional to a load to be weighed for pivoting said balance beam on said support from said first position;

first means for proportionally restraining the pivoting of said balance beam under an imposed unbalancing force; and means spaced from said first means for measuring a displacement of said balance beam from said first position as a measure of the unbalancing force on said balance beam, said means for measuring a displacement of said balance beam including a linear variable differential transformer for sensing the displacement of said balance beam and emitting an electrical out-put signal directly proportional to the displacement and a readout means connected to said transformer to receive said output signal and to digitally indicate the weight of the load causing said unbalancing force on said balance beam in proportional response to said output signal.

31. A hydraulic scale comprising a load platform for receiving a body to be weighed thereon;

a balance beam;

a support pivotally mounting said balance beam thereon in a balanced position and abutting said beam on the topside thereof;

hydraulic means for transmitting a force proportional to the weight of a body on said load platform to said balance beam to pivotally displace said balance beam from said balanced position;

first means on one side of said support for proportionally restraining the displacement of said balance beam from said position;

second means spaced from said first means for measuring a displacement of said balance beam from said balanced position;

read-out means connected to said second means for indicating a weight proportional to a measured displacement of said balance beam whereby the weight of the body on said load platform is indicated; and a tare spring means connected between said support and said beam on an opposite side of said support from said first means to restrain pivoting of said beam.

32. A hydraulic scale comprising a load platform for receiving a body to be weighed thereon;

a member hydraulically connected to said load platform for displacement from a predetermined position in response to the placement of a body on said load platform and movement of said load platform;

first means for proportionally restraining displacement of said member from said position, said first means including a pneumatic system for impinging a jet of air on said member, the force of said jet air being proportional to the displacement of said member;

second means for measuring a displacement of said member from said position; and read-out means connected to said second means for indicating a weight proportional to a measured displacement of said member whereby the weight of the body on said load platform is indicated.

* * * * *